United States Patent [19]

Kimura

[11] Patent Number: 4,818,826

[45] Date of Patent: Apr. 4, 1989

[54] COORDINATE INPUT APPARATUS INCLUDING A DETECTION CIRCUIT TO DETERMINE PROPER STYLUS POSITION

[75] Inventor: Kiyoshi Kimura, Miyagi, Japan

[73] Assignee: Alps Electric Co., Ltd., Japan

[21] Appl. No.: 89,670

[22] Filed: Aug. 25, 1987

[30] Foreign Application Priority Data

Sep. 19, 1986 [JP] Japan .................................. 61-219755

[51] Int. Cl.$^4$ ........................................... G08C 21/00
[52] U.S. Cl. .................................................... 178/19
[58] Field of Search ............................. 178/19, 18, 20

[56] References Cited

U.S. PATENT DOCUMENTS 4,717,793 1/1988 Kobayashi ........................... 178/18

Primary Examiner—Stafford D. Schreyer
Attorney, Agent, or Firm—Guy W. Shoup; Paul J. Winters; Brian D. Ogonowsky

[57] ABSTRACT

A coordinate input apparatus includes proximity detecting means for a coordinate pointing tool on an input plane, wherein detection of the coordinates indicated by the pointing tool is performed when the absolute value of the signal level detected by the coordinate pointing tool twice exceeds a predetermined output level during a single scanning operation. When the coordinate pointing tool is dropped or laid on the input plane, the output signal level does not twice exceed the predetermined level within one scanning operation, and consequently, no coordinate detecting operation will be performed.

4 Claims, 8 Drawing Sheets

FIG. 7

| | FIELD VECTOR H | Hz | Hx |
|---|---|---|---|
| (a) | B, Hx at surface; Hz down, H diagonal; ⊗ Ln, ○ Ln+1, ○ Ln+2 | ↓ | → |
| (b) | B, Hx at surface; Hz down, H diagonal; ○ Ln, ⊗ Ln+1, ○ Ln+2 | ↓ | → |
| (c) | Hz up, H diagonal, B, Hx at surface; ○ Ln, ○ Ln+1, ⊗ Ln+2 | ↑ | → |

COORDINATE INPUT APPARATUS INCLUDING A DETECTION CIRCUIT TO DETERMINE PROPER STYLUS POSITION

BACKGROUND OF THE INVENTION

1. Field of the Invention

The present invention generally relates to a coordinate input apparatus, and more particularly to a coordinate input apparatus capable of eliminating misoperation caused by a tumble of a pickup.

2. Description of the Prior Art

A conventional coordinate input apparatus in electromagnetic induction type coordinate input systems includes conductors embedded in an input plane and the coils employed in a coordinate pointer for detecting electromagnetic fields produced around the conductors which are biased by the power supply. Such a conventional coordinate input apparatus will now be described in more detail with reference to FIGS. 1 to 4.

This coordinate input apparatus as illustrated in FIGS. 1 to 4 is disclosed in Japanese patent application No. 60-282772 corresponding to U.S. patent application Ser. No. 934,665, filed by Alps Electric Co., Ltd. In FIG. 1, the basic arrangement of the coordinate input apparatus is constructed by: an input plane 2b having a main loop 2a and a compensating loop 3a; a driver 2 for supplying current of a constant amplitude to the main loop 2a via an oscillator 1; a driver 3 for supplying current to the compensating loop 3a; and a pickup 6 having a field detecting coil as a coordinate detecting tool. This coordinate input apparatus further includes: an amplifier circuit for amplifying an output detected by the pickup 6; a polarity determining circuit 8; a detecting circuit 9; sample and hold amplifiers 11 and 12; a multiplexer 13; an analog-to-digital (A/D) converter 14; a ROM (random access memory) table 15 for storing compensation values as first memory means; a ROM table 16 for storing correction values for errors of interpolation values as second memory means; and a control circuit 10. In addition, a switching circuit 4 for an X-direction is provided in an X-direction loop of the above-described main loop 2a, whereas a switching circuit 5 is positioned in a Y-direction loop of the main loop 2a.

The main loop 2a is embedded in the input plane 2b in such a manner that each loop is separated by 5 millimeters and positioned in parallel to each other. One terminal of the respective loops "L" is connected to the switching circuit 4 (in case of the Y-direction loop, to the switching circuit 5), and the other terminal thereof is connected to the source line 2s. Accordingly, these loops "L" can be constructed as an input plane having a size of 200 millimeters by 200 millimeters. The source line 2s is connected to the driver 2. The similar loop arrangement is made in the Y-direction to intersect the X-direction loop arrangement at a right angle.

The compensating loop 3a different from the main loop 2a surrounds the entire main loop 2a and is embeded adjacent the source line 2s. One terminal of the compensating loop 3a is connected to the driver 3 which supplies current having a constant amplitude thereto. This current flows through the compensating loop 3a in a direction opposite to that for the current flowing through the source line 2s of the main loop 2a. The other terminal of the compensating loop 3a is grounded.

The ROM table 15 stores, as the first memory means, the compensating values in accordance with the region of the respective loop and the Y direction. As a result of the detection in the control circuit 10, the corresponding compensating value ISC is transferred from the control circuit 10 and the interpolation value is calculated by calculating means in this control circuit 10.

Another ROM table 16 for storing the correction values as the second memory means, has a function to correct the errors based upon the interpolation values calculated by the calculating means, thereby obtaining correct position information in the coordinate system. In the ROM table 16, the correction values for the interpolation values with respect to the 0.1 mm units have been previously stored, for instance, with respect to the detected segments.

In the tip portion of the pickup 6, the field detecting coil is provided to detect the electromagnetic field to thereby produce a detection voltage. This detection voltage is applied to the detecting circuit 9 and polarity determining circuit 8 via the amplifier circuit 7.

Operation of the above-described coordinate input apparatus will now be summarized.

First, position detecting by the pickup 6 is performed by mainly the following three steps in a flowchart shown in FIG. 2. These steps involve a segment detection for recognizing approximate segment positions; interpolation for detecting precise segment positions within the detected segment; and position synthesizing for the segment position and the precise position within the detected segment.

In the step of the segment detection, both the drivers 2 and 3 are operated by utilizing a sine wave produced in the oscillator 1. Under this condition, current flows from the driver 2 through only one loop "L" of the switching circuits 4 and 5 which is designated by the control circuit 10. At the same time, another current having a half amplitude of the amplitude of the current flowing through the main loop 2a, flows through the compensating loop 3a by means of the driver 3.

Assuming that the current flows through the respective loops "L", the electromagnetic fields generated in the respective loops "L" are detected by the pick up 6, and the detected voltage is amplified by the amplifier circuit 7 to obtain a signal having a desired amplitude. The phase of this signal is compared with that of the oscillator output in the polarity determining circuit (phase comparator) 8. In other words, the polarity of the generated field is detected in the polarity determining circuit 8. When the loop "L" on the left-side of the pickup 6 is driven by the driver, then the output from the polarity determining circuit 8 is "H", whereas the output from the polarity determining circuit 8 is inverted into "L", when the loop "L" on the right side of the pickup 6 in the drawing is driven.

Accordingly, when the loops "L" are sequentially selected by the control circuit 10 from $X_1$ to $X_n$ to supply the current thereto, the approximate position of the pickup 6, i.e., the segment adjacent the pickup 6 can be detected since the output derived from polarity determining circuit 8 is inverted.

The basic idea of this detecting method will now be described in more detail.

FIG. 4 illustrates a typical detected voltage distribution. It should be noted that the distribution of the magnetic field strength "Hz" corresponding to the respective loop "L" represents negative at the left side of the zero point and positive at the left side thereof, and absolute value of the magnetic field strength Hz is detected as the voltage. As seen from FIG. 4, each of the segments is positioned at 10 mm intervals from each other, and separated from the respective loops "L" by 5 mm, and furthermore portions of the adjoining segments are superimposed with 5 mm intervals, which distribution corresponds to that illustrated in FIG. 3. Note that for convenience sake, the respective loops corresponding to X=5 n mm; 5 (n+1) m; 5 (n+2) mm; 5 (n+3) mm; and 5 (n+4) mm are referred to as L5n; L5(n+1); L5(n+2); L5(n+3); L5(n+4), respectively, where $0 \leq n \leq 37$, "n" being integer.

When the pickup 6 is positioned A-position, the scanning signal is sequentially transferred to the respective loops in turn. When the L5(n+3) loop receives the scanning signal, i.e., SEG=n+3 and X=5(n+3) mm, the magnetic field becomes newly positive and the pickup 6 is located at the region defined by $\leq 5(n+3)$ mm. Then, the detection voltage $V_{n+3}$ in the L5(n+3) loop can be obtained Thereafter, the loop X=5(n+1) mm SEG=n+1 which is positioned at two segments before the presently scanned segment, are selected to obtain another detection voltage $V_{n+1}$. At this stage, the magnetic field is surely negative and the polarities of the magnetic fields produced between the loops L5(n+1) and L5(n+3) are inverted with each other. As a result, the A-position is located within the region of SEG=n+1, i.e., the region defined by (n+1) mm$\leq X \leq 5$ is (n+3) mm. Consequently, this implies that the pickup 6 is located within the region defined by 15 mm$\leq X \leq 25$ mm, and SEG=3 in FIG. 3.

After the segment in question is detected on the basis of the above-described detection principle (in FIG. 4, SEG=n+1 and other segments), the loop L5(n+1) located at the most left position of this segment SEG=n+1 is selected by the control circuit 10. In this case, the signal processed in the pickup 6 and amplifier circuit 7 is DC-converted by the detecting circuit 9 and then held by the sample and hold amplifier circuit 11, as a DC voltage.

Subsequently, the loop L5(n+3) located at the right end of the segment SEG=n+1 is selected by the control circuit 10. In this case, the control circuit 10 selects the succeeding loop L5(n+3) with jumping over the loop L5(n+2), because half portions of the respective segments are superimposed with each other so as to improve precision. Similarly, the DC voltage obtained by the detecting circuit 9 is held by the sample and hold amplifier circuit 12.

Under these circumstances, the DC voltages which have been held by the sample and hold amplifier circuits 11 and 12 are selected in response to the control signal from the control circuit 10, and then A/D-converted into corresponding digital values to obtain the resultant voltages Vn+1, Vn+3 from the loops L5(n+1) and L5(n+3).

In the next step, both the switching circuits 4 and 5 are turned off under control of the control circuit 10. As a result, since the above-mentioned predetermined current flows through only the compensating loop 3a, the detection output is A/D-converted according to the same way, to produce the voltage Vc derived only from the compensating loop 3a.

Subsequently, the control circuit 10 causes the ROM table 15 to derive the compensating values ISC corresponding to the segment values (distances in the same direction) in the X and Y directions, which are obtained by the segment determination, and secondly causes the calculating means in the control circuit 10 to calculate the interpolation value P' by employing the following equation with using the voltages Vn+1, Vn+3, Vc and the compensating value ISC;

$$P' = \frac{V_{n+1} - ISC \cdot V_c}{V_{n+1} + V_{n+3}}$$

After this interpolation value P' is calculated, the correction value to correct the above-described error which has been stored in the ROM table 16, is derived from the ROM table 16 so as to obtain the coordinate value specifying the position within the segment. The desirable X-coordinate data of the pickup pointing position can be calculated by synthesizing the position coordinate data of the segment and the coordinate value within this segment by means of the calculating means in the control circuit 10.

Similarly, the Y-coordinate data of the pickup pointing position is calculated and the calculated coordinate data is output via the interface circuit 17 to a host computer.

In accordance with the convention electromagnetic induction type coordinate input apparatus, there is provided proximity detecting means by which the coordinate outputs can be produced without actually pressing the pickup 6 on the input plane 2b by annual operator.

In one of the convention proximity detecting stem, the respective loops "L" of the input plane are sequentially driven. If the field detection age output from the coil within the pickup 6 exceeds a predetermined value, it can be determined that the tip portion of the pickup 6 is held in close vicinity to the input plane 2b, and then the scanning operation is stopped at the time instant when the proximity of the pickup is detected, so that a predetermined coordinate detecting operation will be commenced.

However, in such a conventional proximity detecting method, even if the pickup 6 is laid on the input plane 2b, the proximity detection is carried out since the tip portion of the pickup 6 is held in close vicinity to the input plane 2b. Accordingly, if the detection voltages are produced under these conditions, the coordinate outputs containing many errors and error operations are produced because the detection of the succeeding segment and also the production of the interpolating field are improperly effected. In fact, while the pickup 6 is laid on the input plane 2b, the cursor displayed on the display screen may jump over the entire screen uncertainly, so that the input position on the input plane 2b cannot be specified, resulting in the misoperation.

To overcome the above drawback, one solution may be proposed that a stylus pen formed as the pickup 6 employs in its inside, detection means such as a switch for detecting falling of the stylus pen, and no output derived from the pickup coil 6 is supplied to the amplifier circuit 7 and the control circuit 10 when the stylus pen tumbles. Such a stylus pen, however, has a complex construction and a higher manufacturing cost. Moreover, a large diameter of a cable connected to the stylus pen is necessarily required, which causes the pointing operation by the stylus pen to be inconvenient.

The present invention seeks to overcome conventional drawbacks, and has as an object to provide a coordinate input apparatus wherein the tumble condition of the coordinate pointing tool is detected not by mechanical means, but by electronic means so as to prevent detection errors and misoperation.

SUMMARY OF THE INVENTION

The objects of the present invention are accomplished by providing a coordinate input apparatus wherein scanning signals are sequentially supplied to a plurality of conductors embedded in an input plane with a parallel arrangement and a coordinate position on the input plane is detected on the basis of a signal detected by a coordinate pointing tool for arbitrarily pointing out a position on the input plane, characterized by comprising:

means for detecting proximity of the coordinate pointing tool when the coordinate pointing tool is positioned in close vicinity to the input plane and for performing a coordinate detecting operation when absolute values of an output signal detected from said conductors twice exceed twice a predetermined output level during a single scanning operation.

BRIEF DESCRIPTION OF THE DRAWINGS

The above object and other useful features of the present invention will become more readily apparent in the following description of the accompanying drawings, in which;

FIGS. 5 through 9 illustrate the basic idea of the invention;

DETAILED DESCRIPTION OF PREFERRED EMBODIMENTS

BASIC IDEA

A basic idea of the present invention will now be described to achieve the proper coordinate detecting operation only when the coordinate pointing tool is positioned with its correct attitude.

Figure 5:
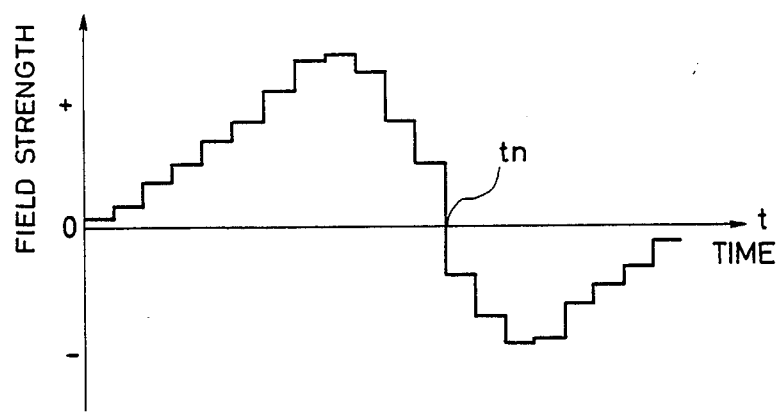

When the RF (radio frequency) current sequentially flows through the loops "L" which are the same as the conventional loops, the magnetic field strength of the coil within the pickup 6 is illustrated in a graph of FIG. 5 under the condition that the pickup 6 is positioned substantially normal to the input plane 2b. In this example, the pickup 6 is positioned in vicinity of the loop corresponding to the time instant "tn". This fact can be recognized in that the polarity of the magnetic field is inverted near the time instant "tn".

Figure 6:
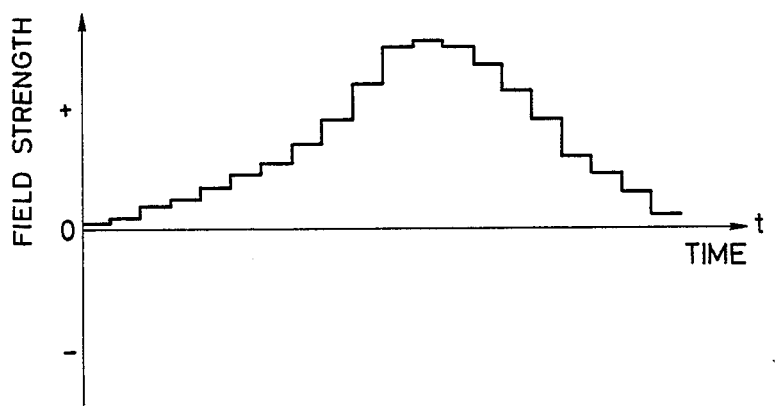

If, on the other hand, the pickup 6 is laid down, the polarity of the detected field strength is constant, as illustrated in FIG. 6, i.e., no polarity inversion.

A difference between the phenomena shown in FIGS. 5 and 6 will now be described in more detail, referring to FIG. 7.

FIG. 7 shows a magnetic field vector "H" at a point "B" while the current sequentially flows through three loops; a vector component "Hx" in a direction (X-axis) parallel to the input plane 2b; and a vector component "Hz" in a direction (Z-axis) perpendicular to the input plane 2b. It should be noted that the current flows through only the loop denoted . Specifically, FIG. 7a illustrates the current flowing condition of the left loop Ln; FIG. 7b represents that of the center loop Ln+1; FIG. 7c indicates that of the right loop Ln+2. In this condition, the strength of the magnetic field vector "H" is inversely proportional to a distance between the energized loop and the coil position of the pickup 6, and the direction thereof corresponds to the tangential direction at the point "B" on a circle having a diameter of the loop and point "B"

Assuming that the above-defined parallel direction component Hx and vertical direction component Hz for the magnetic field vector H are taken into account, the vertical direction component Hz is inverted between the loops Ln+1 and Ln+2, whereas the parallel direction component Hx is not inverted. Since the pickup 6 is used to be tilted with respect to the input plane 2b near right angle, the detection coil detects mainly the vertical direction component Hz. To the contrary, if the pickup 6 is laid, or tumbled on the input plane 2b, this coil mainly detects the parallel direction component $H_X$ but substantially no vertical direction component Hz, since it has sensitivity to the field direction parallel to the input plane 2b. Consequently, when the pickup 6 is in close vicinity to the input plane 2b with the proper attitude, i.e., it is not laid on the input plane 2b, the polarity inversion of the magnetic field is necessarily detected.

With the above description, the previous magnetic field strength changes appear in FIGS. 5 and 6.

Figure 1:
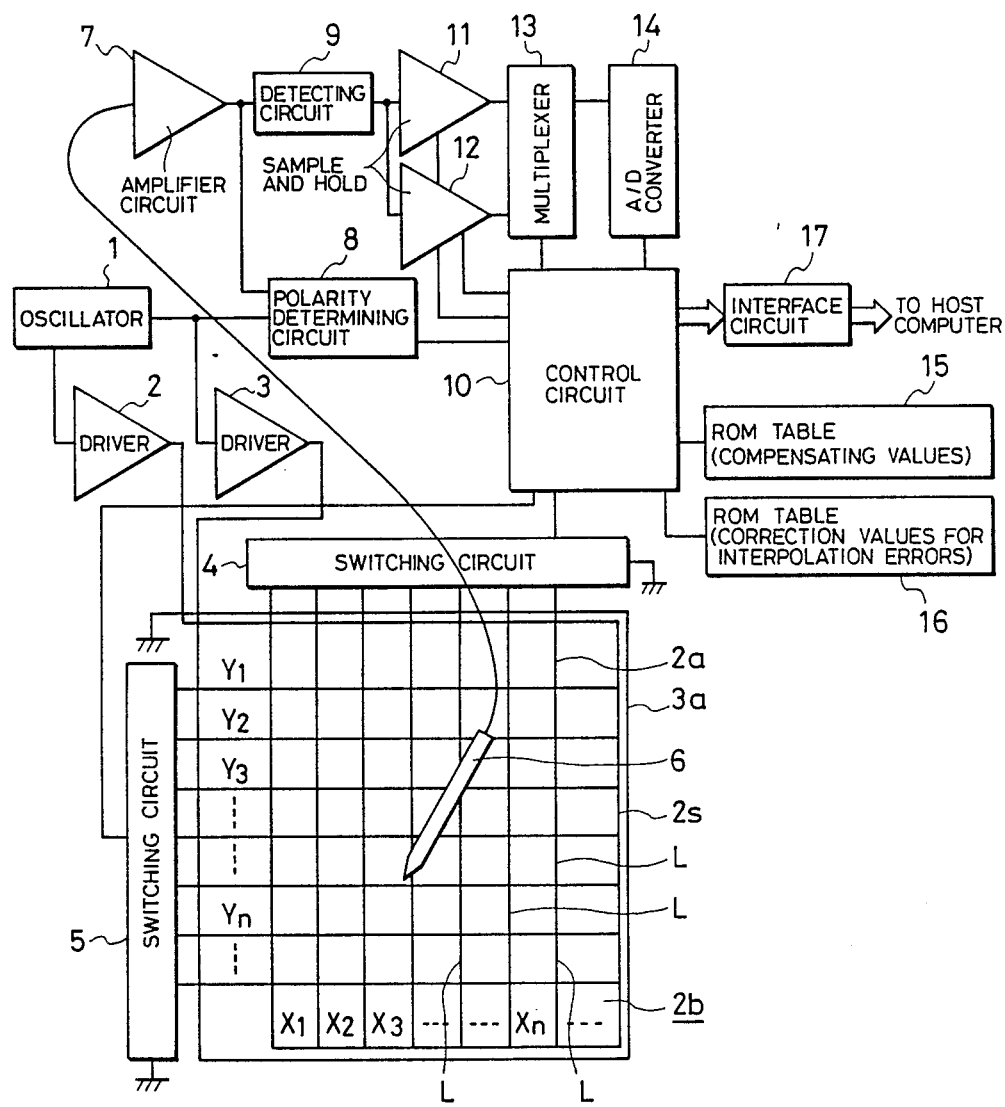
FIG. 1 is a schematic block diagram of the conventional coordinate input apparatus.
Figure 8:
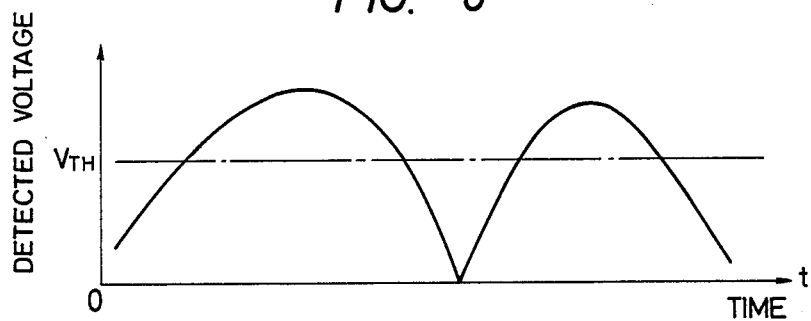
Figure 9:
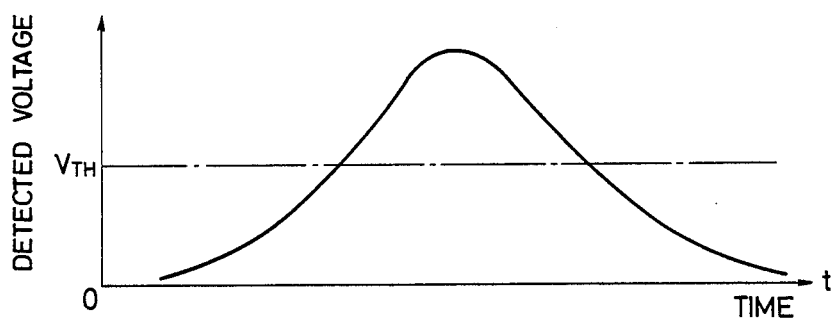

In the above-described coordinate input apparatus as illustrated in FIG. 1, the pickup 6 receives the varied field produced by supplying the RF current to the respective coils so as to monitor the amplitude of the detected RF voltage. Accordingly, the detected field distribution curves as shown in FIGS. 5 and 6 correspond to those as illustrated in FIGS. 8 and 9 respectively.

It is therefore to determine a threshold voltage "$V_{TH}$" for the proximity detection, i.e., a predetermined set voltage according to the invention. The detected voltage is checked according to the following basis, while scanning the loops "L" by the RF current. The detected voltage once exceeds the above threshold voltage $V_{TH}$ and thereafter is lower than the $V_{TH}$. Thereafter, if the detected voltage again exceeds the threshold voltage $V_{TH}$, the coordinate data detection is carried out because the pickup 6 is tilted to the input plane 2b at a right angle. In contrast, if the detected voltage does not again exceed the threshold voltage $V_{TH}$, no coordinate data detection is performed because the pickup 6 may be laid on the input plane 2b. As a result, the coordinate input apparatus employing the above-defined basic idea of the invention, can prevent occurrence of the detection errors and the misoperation caused by laying the pickup 6 down.

ARRANGEMENT OF COORDINATE INPUT APPARATUS

Figure 10:
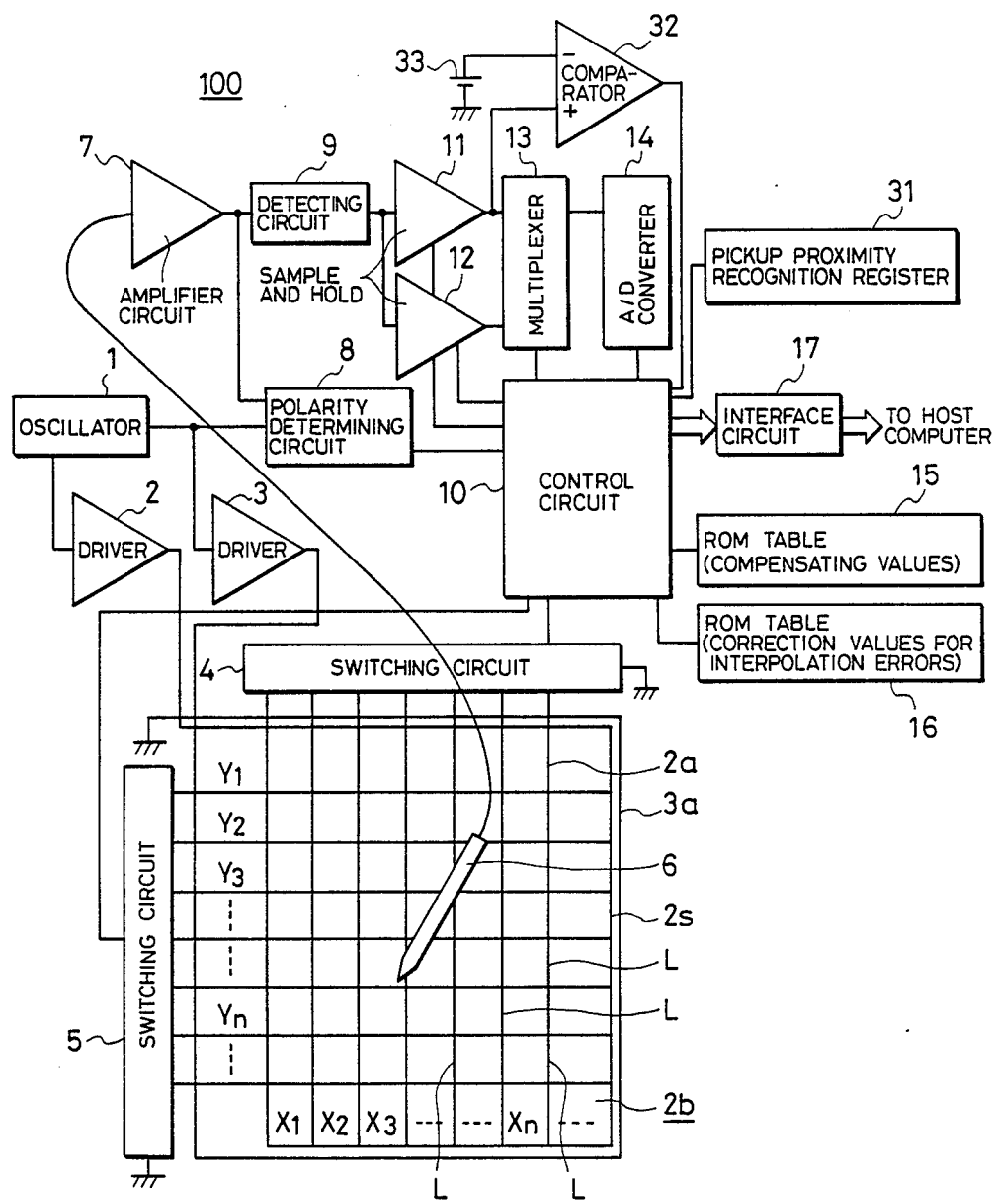
FIG. 10 is a schematic block diagram of a coordinate input apparatus according to one preferred embodiment of the invention.

Referring now to FIG. 10, an arrangement of a coordinate input apparatus 100 according to one preferred embodiment will be described.

It should be noted that the same reference numerals shown in FIG. 1 will be employed as those for denoting the same circuit elements shown in FIG. 10. Accordingly, no description of these same or similar circuit elements will be made in the following description.

As is easily seen from the circuit arrangement of FIG. 10, the coordinate input apparatus 100 employs the following new circuit arrangements in addition to the circuit arrangements of the conventional coordinate input apparatus shown in FIG. 1. That is to say, the coordinate input apparatus 100 further includes a pickup proximity recognition register 31 connected to the control circuit 10, and a comparator 32 for comparing the output voltage derived from the sample and hold amplifier 11 with a voltage from a power supply 33 for presetting the threshold voltage $V_{TH}$. The recognition register 31 and the comparator 32 constitute proximity detecting means for the coordinate pointing tool.

OPERATION OF APPARATUS

Figure 11:
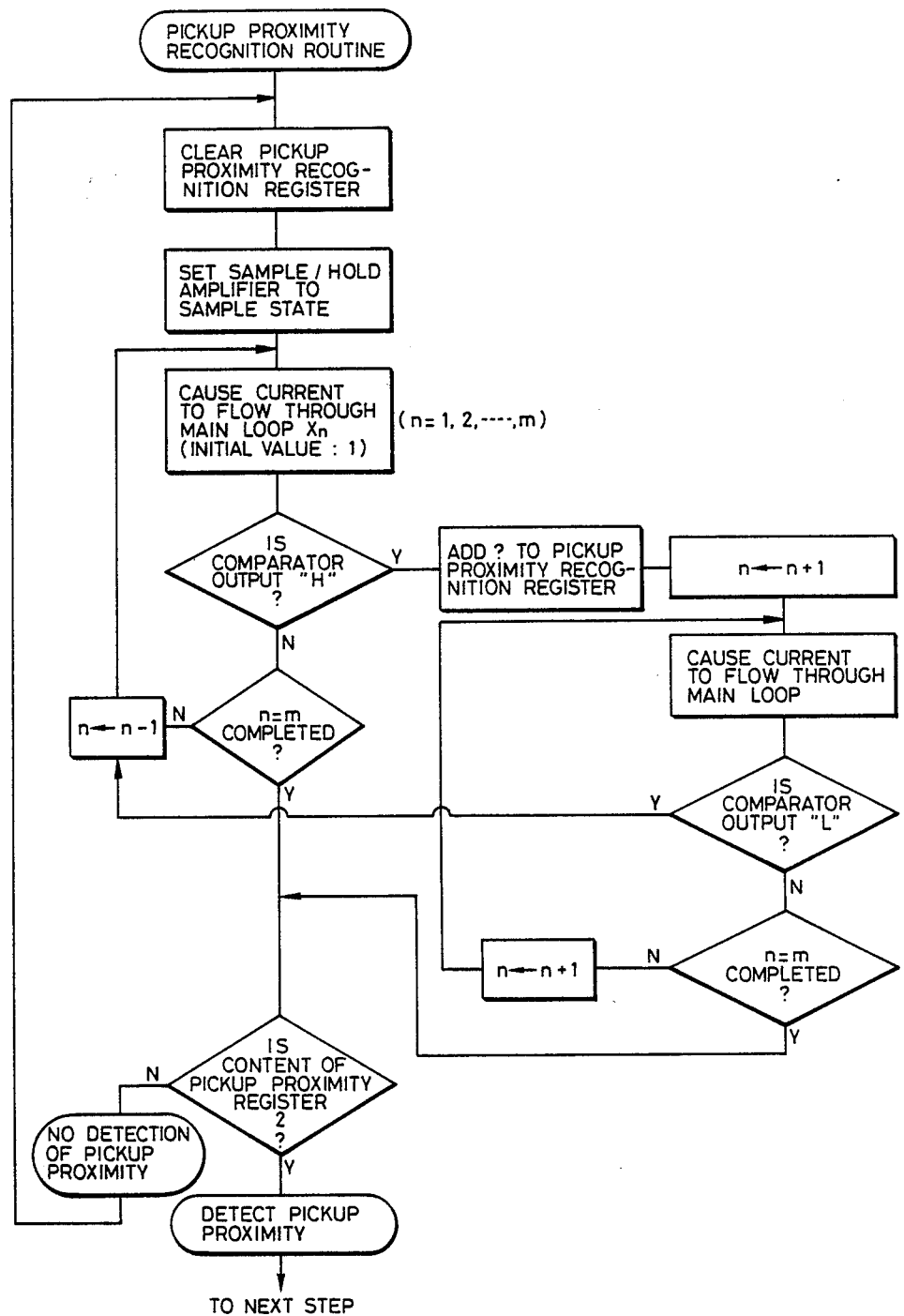
FIG. 11 is a flowchart for explaining the typical operation of the apparatus shown in FIG. 10.

Operation of the apparatus 100 will now be described, referring to FIGS. 10 and 11 (flowchart).

Before entering the conventional detection operation, the pickup proximity recognition register 31 is cleared under control of the control circuit 10. Then, after completing the setting of the sample and hold amplifier 11 in the sample condition, the entire loops Xn are scanned by sequentially supplying the RF current to the respective loops Xn of the main loop 2a in the X-axis direction. In this scanning step, the comparator 32 compares the above threshold voltage $V_{TH}$ and the output derived from the sample and hold amplifier 11. If the comparison output of the comparator 32 becomes "H", the detected voltage once exceeds this threshold voltage $V_{TH}$, as clearly illustrated in FIGS. 8 and 9. In this case, "1" is added to the pickup proximity recognition register 31 and subsequently the succeeding loop is scanned to obtain another output from the comparator 32.

Figure 2:
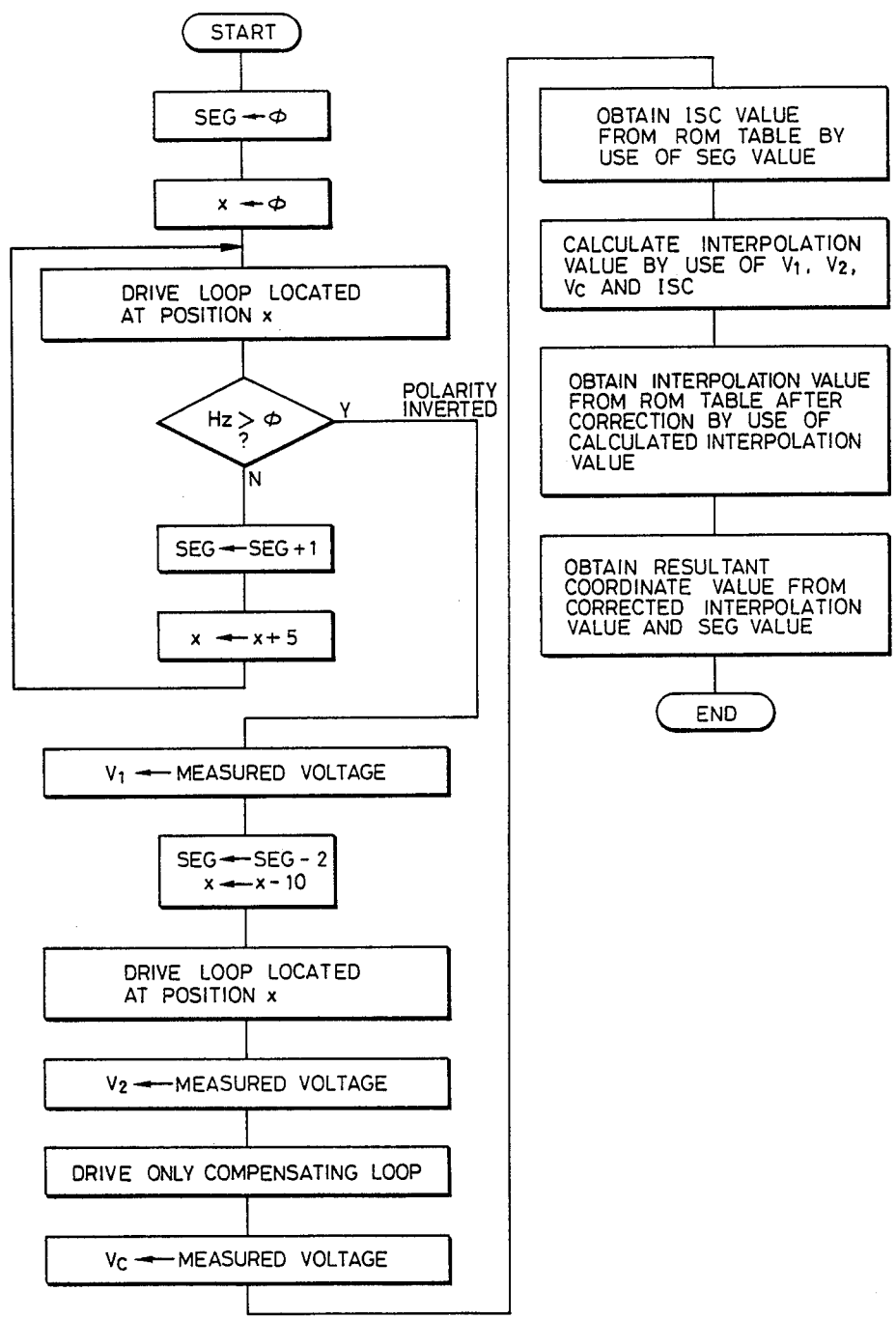
FIGS. 2 to 4 are illustrations for explaining the operation of the coordinate input apparatus shown in FIG. 1.
Figure 3:
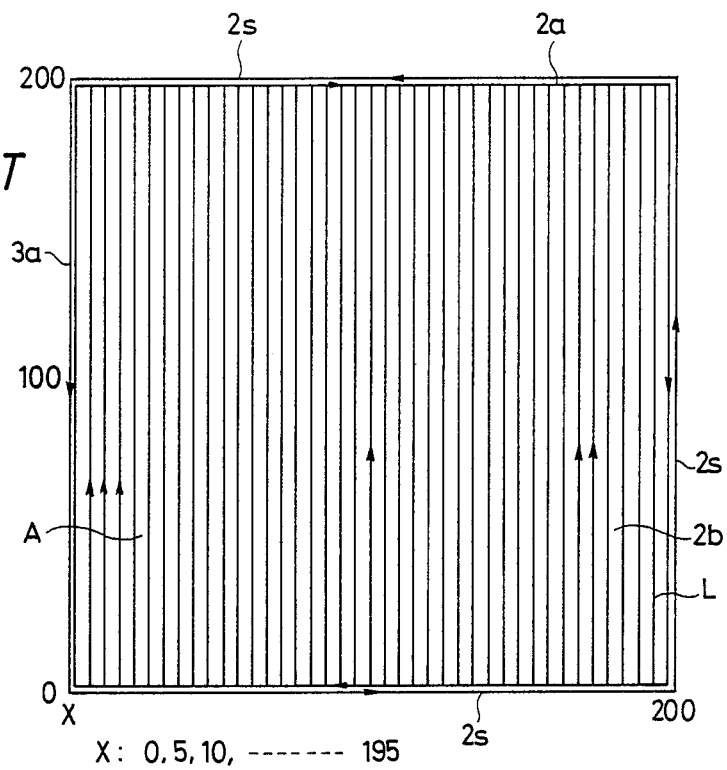
Figure 4:
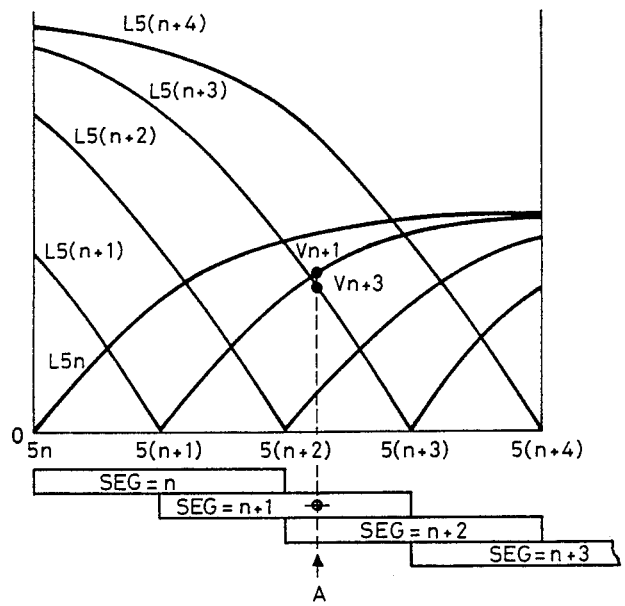

If the comparator output exceeds the threshold voltage $V_{TH}$ two times during the above loop scanning steps, the content of the pickup proximity recognition register 31 becomes 2 even if the resultant detection voltage is higher or lower than the threshold voltage $V_{TH}$. When the content of the pickup proximity recognition register 31 becomes 2, the control circuit 10 can determine based upon the above-described basic idea that the proper coordinate data input is performed with holding the pickup 6 on the input plane 2b at the proper attitude, i.e., approximately 90 degrees with respect thereto. When such a determination is accomplished by the control circuit 10, the pickup proximity detecting operation is completed and the succeeding operation as illustrated in the flowchart of FIG. 2 will be commenced.

When the pickup 6 is tumbled during the pickup proximity detecting operation, the control circuit 10 surely does not judge on the basis of the basic idea, that the coordinate data can be input because the content of the pickup proximity recognition register 31 is not equal to 2. Consequently, the coordinate detecting operation cannot be performed in response to the input signal from the pickup 6 when the pickup 6 is tumbled above the input plane 2b. As a consequence, it can prevent the errors and misoperation caused by the tumble of the pickup 6.

In addition, if the detected voltage from the pickup 6 does not reach the threshold voltage $V_{TH}$, no coordinate detecting operation is carried out since it can judge that the attitude of the pickup 6 is not correct and the pickup 6 is not located in the correct position (i.e., the content of the pickup proximity recognition register 31 does not become 2, resulting in the same judgement by the control circuit 10). In other words, the coordinate detecting operation can be expected only when the pickup 6 is held in the proper input attitude.

While the present invention has been described using a specific embodiment, it should be understood that further modifications and changes can be made without departing from the scope of the present invention.

For instance, although the electromagnetic induction system was employed in previous coordinate input apparatus, the present idea is applicable to other non-contact detecting systems such as the electrostatic induction system.

As previously described in detail, the coordinate input apparatus according to the invention includes proximity detecting means for the coordinate pointing tool on the input plane, by which a detection is performed that the absolute value of the signal level detected by the coordinate pointing tool exceeds twice over the predetermined output level during a single scanning operation. When the coordinate pointing tool is tumbled with respect to the input plane, the output signal level does not exceed the predetermined level two times within one scanning operation, so that this tumble of the tool can be detected by the electronic method. Moreover, while detecting such a tumble condition, no coordinate detecting operation will be performed. As a result, no error and misoperation occur when the coordinate detecting operation is effected by the coordinate input apparatus. In addition, since this proximity detecting means is arranged by use of the electronic means, the coordinate input operation is not demaged.

What is claimed is:

1. A coordinate input apparatus wherein scanning signals are sequentially supplied to a plurality of conductors embedded in an input plane with a parallel arrangement and a coordinate position on the input plane is detected on the basis of a signal detected by a coordinate pointing tool for arbitrarily pointing out a position on the input plane, characterized by comprising:
means for detecting proximity of the coordinate pointing tool when the coordinate pointing tool is positioned in close vicinity to the input plane and for performing a coordinate detecting operation when absolute values of an output signal detected from said conductors twice exceed a predetermined output level during a single scanning operation.

2. A coordinate input apparatus as claimed in claim 1, wherein when the coordinate pointing tool is positioned in close vicinity to the input plane, RF (radio frequency) current is caused to flow through a specific single conductor.

3. A coordinate input apparatus as claimed in claim 1, wherein said proximity detecting means for the coordinate pointing tool is operated under an electromagnetic induction system.

4. A coordinate input apparatus as claimed in claim 1, wherein said proximity detecting means for the coordinate pointing tool is operated under an electrostatic induction system.

* * * * *